United States Patent [19]

Watanabe

[11] 4,118,038
[45] Oct. 3, 1978

[54] VIBRATION TRANSMISSION MECHANISM FOR A PHONOGRAPH

[75] Inventor: Katsumi Watanabe, Kawasaki, Japan

[73] Assignee: Yugen Kaisha Watanabe Kenkusho, Kawasaki, Japan

[21] Appl. No.: 787,445

[22] Filed: Apr. 14, 1977

[30] Foreign Application Priority Data

Aug. 21, 1976 [JP] Japan .................. 51-10003

[51] Int. Cl.² ................... G11B 3/28; G11B 3/40
[52] U.S. Cl. .................... 274/9 B; 274/9 C
[58] Field of Search ............ 274/1 A, 7, 9 R, 9 B, 274/9 C

[56] References Cited

U.S. PATENT DOCUMENTS

| 3,712,629 | 1/1973 | Watanabe | 274/9 RA |
| 3,825,268 | 7/1974 | Halland et al. | 353/19 |

Primary Examiner—Steven L. Stephan
Attorney, Agent, or Firm—Basile and Weintraub

[57] ABSTRACT

A phonograph of the type wherein a plastics-made tone arm having an upstanding stylus mounted thereon is pivoted eccentrically on a turntable or rotor, under which a speaker is mounted concentrically for simultaneous rotation therewith relative to a record immovably supported above the turntable. Also mounted on the turntable is a metal-made vibration transmitter rod which is substantially pivotally supported at one end and which rests, at a point intermediate both ends thereof, on the armature of the speaker partly exposed through an aperture in the turntable. The tone arm has its free end resting on the vibration transmitter rod for sliding movement, during playback, from the other end of the rod toward its point of contact with the speaker armature. In order to preclude unnecessary changes in the volume of sound generated by the speaker during playback, the distance between the stylus and the variable point of contact of the tone arm with the vibration transmitter rod is made to decrease, with the progress of playback, in as exact proportion as feasible to the distance between the mentioned variable point and the fixed point of contact of the rod with the speaker armature.

5 Claims, 5 Drawing Figures

VIBRATION TRANSMISSION MECHANISM FOR A PHONOGRAPH

BACKGROUND OF THE INVENTION

1. Field of the Invention

My invention relates to sound reproducing apparatus, and in particular to an improved vibration transmission mechanism for a phonograph of the type wherein the mechanical vibrations set up in a reproducing stylus by the undulations of a record groove are transmitted directly (i.e., without the process of electrical amplification) to a speaker diaphragm, causing same to generate audible vibrations of the air.

2. Description of the Prior Art

There has been known and used a phonographic vibration transmission mechanism comprising a vibration transmission rod which is maintained in relative sliding contact with a tone arm carrying a stylus and which is further urged against, or rests upon, a speaker or its armature. The vibration transmission mechanism of this type, as heretofore constructed, has been subject to the drawback that the volume of sound generated by the speaker unnecessarily changes to an appreciable degree in the course of playback.

I have found that the above drawback is caused by the change, with the progress of playback, in the distance between the stylus on the tone arm and the variable point of contact of the latter with the vibration transmitter rod and in the distance between this variable point and the fixed point of contact of the vibration transmitter rod with the speaker. No particular attention has so far been paid to such changes in the effective lengths of the vibration transmitting members.

According to my Japanese Patent Application No. 46-31762, for example, the distance between the stylus and the variable point of contact between tone arm and vibration transmitter rod is maximum when the tone arm is in its starting position at the perimeter of the disc record, gradually diminishes to a minimum in the middle of playback, and again increases toward the end of playback. Since the tone arm is usually molded of plastics, which is comparatively easy to absorb vibrations, the sound-producing vibrations transmitted therethrough from the stylus to the vibration transmitter rod are of minimum intensity or amplitude at the start and the end of playback and are of maximum intensity in the middle of playback.

The vibration transmitter rod, on the other hand, is usually made of material which is considerably less easy to absorb vibrations than plastics. Hence, the greater the distance between its variable point of contact with the tone arm and its fixed point of contact with the speaker, the more does the vibration transmitter rod amplify the vibrations before they reach the speaker. Since this distance also changes with the progress of playback, however, the amplitude of the sound-producing vibrations transmitted from the stylus to the speaker is dually affected by the varying distance between the stylus and the point of contact of the tone arm with the vibration transmitter rod and by the varying distance between that point and the point of contact of the rod with the speaker, resulting in the aforesaid unnecessary changes in sound volume in the course of playback.

SUMMARY OF THE INVENTION

It is accordingly an object of my invention to provide an improved vibration transmission mechanism, for use in sound reproducing apparatus of the type defined, that precludes unnecessary changes in sound volume in the course of playback.

Another object of my invention is to attain the first recited object without use of any extra means designed expressly for that purpose and hence without adding to the cost of the apparatus.

Summarized briefly, the vibration transmission mechanism in accordance with my invention comprises a tone arm and a vibration transmitter rod which are so constructed and arranged in relation to the position of a reproducing stylus on the former that, during playback, the distance between the stylus and the variable point of contact of the tone arm with the vibration transmitter rod changes substantially in proportion to the distance between the said variable point and the fixed point of contact of the vibration transmitter rod with speaker means.

Preferably, the stylus should be so situated on the tone arm as to be closer to the pivot of the tone arm than its variable point of contact with the vibration transmitter rod, and in this case the angle between tone arm and vibration transmitter rod should not exceed 90 degrees throughout the course of playback. Thus, the distance between the stylus and the variable point of contact of the tone arm with the vibration transmitter rod and the distance between the variable point and the fixed point of contact of the rod with the speaker means are both maximum when the tone arm is in its starting position at the perimeter of the record means. Both distances decreases substantially proportionately with the progress of playback until they are minimized at the end of playback.

In a preferred embodiment of my invention, the vibration transmission mechanism of the foregoing construction is mounted on a turntable which rotates, together with the speaker means mounted concentrically thereunder, relative to the record means immovably supported above the turntable. The vibration transmitter rod is substantially pivotally supported at one end on the turntable and rests, at a point intermediate both ends thereof, on an armature of the speaker means partly exposed through an aperture in the turntable. Also pivoted eccentrically on the turntable, the tone arm has its free end resting on the vibration transmitter rod for sliding movement, during playback, from the other end of the rod toward its point of contact with the speaker armature.

The tone arm is preferably molded of plastics, whereas the vibration transmitter rod is metal-made. Since these meterials have the contrary vibration transmitting characteristics as aforesaid, the proportionate decrease in the two distances in question enables the tone arm and the vibration transmitter rod to coact to preclude undesired changes in the volume of sound generated by the speaker means during playback.

The above and other objects, features and advantages of my invention and the manner of attaining them will become more apparent, and the invention itself will best be understood, from the following description of the preferred embodiment which is to be read in connnection with the accompanying drawings.

DESCRIPTION OF THE PREFERRED EMBODIMENTS

In the accompanying drawings my invention is shown applied to a phonograph of the type described and claimed in my copending application U.S. Ser. No. 787,446, entitled "Phonograph for Use with Record Cartridges" and filed substantially concurrently herewith. The contents of the copending application are incorporated herein insofar as is necessary for a full understanding of the present invention.

Figure 1:
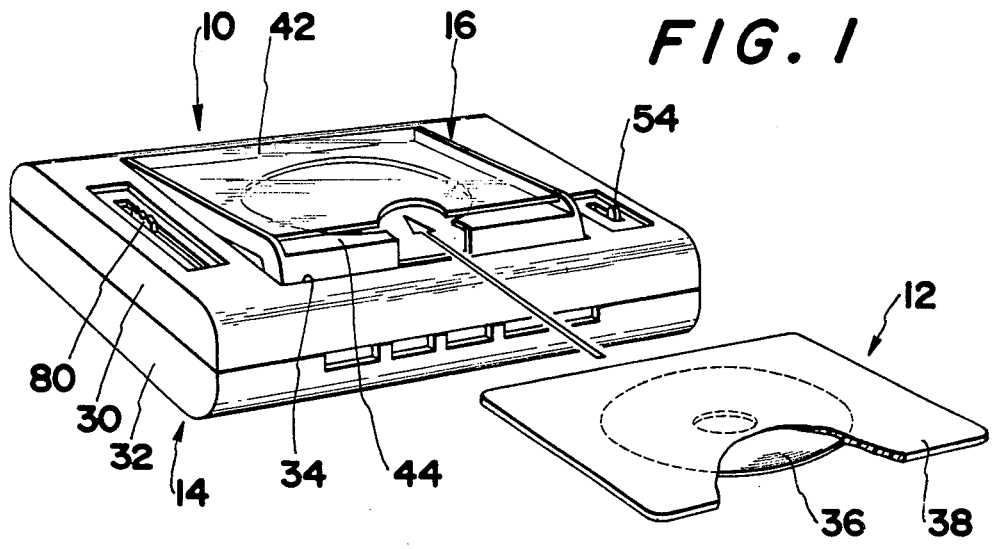
FIG. 1 is a perspective view of a phonograph incorporating the vibration transmission mechanism in accordance with my invention, with the phonograph being shown together with what is herein termed a "record cartridge", partly broken away, that is suitable for use therewith.

The phonograph is shown in its entirety and generally designated 10 in FIG. 1 of the drawings, which also illustrates a record cartridge 12 suitable for use with the phonograph. The phonograph 10 comprises a box-like casing 14 and a cartridge holder 16 pivotally mounted thereon for immovably but replaceably holding the record cartridge 12.

Figure 2:
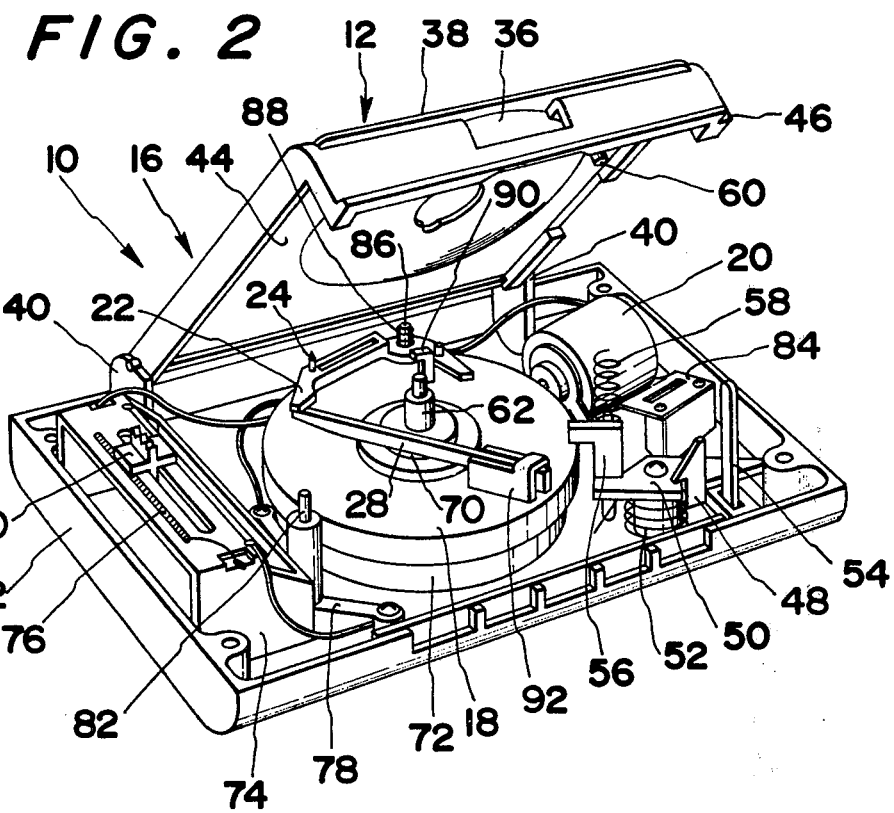
FIG. 2 is a perspective view showing the phonograph of FIG. 1 with the top half of its casing removed and with the cartridge holder, containing the record cartridge, widely opened to reveal the inner details of the casing.
Figure 3:
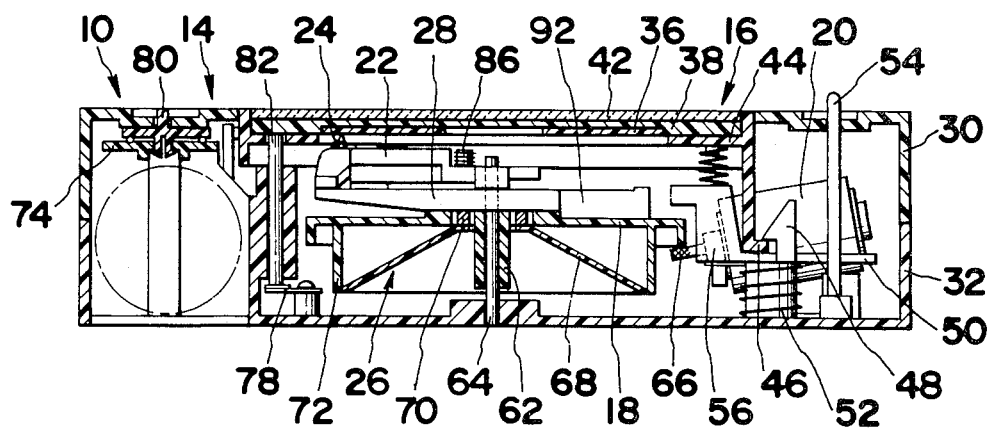
FIG. 3 is a vertical sectional view of the phonograph of FIGS. 1 and 2, with the phonograph being shown sectioned in substantially two different planes.

As will be seen from FIGS. 2 and 3, the phonograph 10 further comprises, broadly, a turntable or rotor 18 rotatably mounted within the casing 14, an electric motor 20 for driving the turntable, a tone arm 22 pivoted eccentrically on the turntable, a reproducing stylus 24 extending upwardly from the tone arm for receiving sound-producing vibrations from the record cartridge 12, a speaker 26 mounted concentrically under the turntable for simultaneous rotation therewith, and a vibration transmission rod 28 mounted on the turntable for transmitting the vibrations of the stylus to the speaker.

With reference back to FIG. 1, the casing 14 of the phonograph 10 comprises a top half 30 and a bottom half 32 which can be both molded of plastics and which are suitably fastened together. The casing top half 30 has formed therein a rectangular opening 34 for somewhat loosely receiving the cartridge holder 16.

The record cartridge 12 also shown in FIG. 1 is, in essence, a substantially integral assembly of a disc record 36 and a record holder 38. In the form of a rectangular sheet of plastics or other material, this record holder has formed in one of its faces a circular depression for neatly and undetachably receiving the disc record 36, with the grooved face of the record directed away from the record holder. Preferably, the record holder 38 may bear on its other face any suitable visual information pertaining to the audio information stored on the record.

Pivoted at its rear end to a pair of lugs 40 formed integral with the casing bottom half 32 as shown in FIG. 2, the cartridge holder 16 integrally comprises a top plate 42 and a bottom plate 44 with a space therebetween for receiving the record cartridge 12 through the slot formed in its front, free end, with the record 36 of the cartridge facing downwardly. It will be noted from FIG. 3 in particular that the space bounded by the cartridge holder 16 is shaped and sized to suit the record cartridge 12 so that the latter may be immovably retained therein. The bottom plate 44 of the cartridge holder is centrally open to expose the record 36. Thus, upon full closure of the cartridge holder 16 as shown in FIG. 3, the stylus 24 on the tone arm 22 engages the usual spiral sound groove of the record 36.

The cartridge holder 16 has a ledge 46 projecting laterally from the downturned flange at its front end. This ledge 46 is to move, with the pivotal movement of the cartridge holder 16 relative to the phonograph casing 14, into and out of engagement with an upstanding hook 48 integrally connected to a swivel arm 50 mounted on the bottom of the casing for pivotal movement in a horizontal plane. The swivel arm 50 together with the hook 48 thereon is biased to turn clockwise, as viewed in FIG. 2, by a torsion spring 52, with the result that the swivel arm is urged against an ejector lever 54 pivotally mounted on the bottom of the phonograph casing.

Seen at 56 in FIGS. 2 and 3 is an inverted L-shaped limit stop which is formed integral with the swivel arm 50 and which overhangs the turntable 18 to limit its upward motion, as will be explained later in further detail. A helical compression spring 58 is anchored at its bottom end to a boss on the bottom of the casing 14 and at its top end to a boss 60 projecting downwardly from the bottom plate 44 of the cartridge holder.

Upon manual depression of the free or front end of the cartrige holder 16 against the force of the compression spring 58, therefore, the ledge 46 of the cartridge holder slides down the sloping top edge of the hook 48 thereby causing the swivel arm 50 to turn counterclockwise against the bias of the torsion spring 52. The hook 48 is urged by the torsion spring into positive engagement with the ledge 46 when the cartridge holder 16 is fully closed, with its top plate 42 disposed flush with the casing top half 30 as shown in FIG. 3. The cartridge holder 16 can thus be held fully closed in spite of the upward force of the compression spring 58.

It may be mentioned that the cartridge holder 16 is shown widely open in FIG. 2 merely to reveal the inner details of the casing 14. In the normal use of this phonograph 10, the cartridge holder is to be pivoted between the half-closed or "eject" position shown in FIG. 1 and the fully closed or "playback" position shown in FIG. 3. The record cartridge 12 may be slid into the cartridge holder 16 through its front slot when the holder is in the half-closed position of FIG. 1. As the cartridge holder is subsequently depressed to and locked in the fully closed position of FIG. 3, the turntable 18 will be automatically set in rotation to commence playback of the record cartridge, as will be more fully described hereinbelow.

Upon completion of playback, the tip of the ejector lever 54, projecting upwardly of the casing top half 30 as seen in FIGS. 1 and 3, may be pressed rearwardly to move the hook 56 out of engagement with the cartridge holder ledge 46 via the swivel arm 50 against the bias of the torsion spring 52. Thereupon the cartridge holder 16 will pop up to the half-closed position of FIG. 1 under the force of the compression spring 58, ready for ejection of the record cartridge 12.

Preferably, at least the top plate 42 of the cartridge holder 16 should be molded of transparent material, in order that the user may be enabled simultaneously to see the visual information on the top face of the record cartridge 12 and to listen to the audio information being played back by the phonograph. In this manner the phonograph can be employed for audiovisual education or like purposes.

As shown in both FIGS. 2 and 3, the turntable or rotor 18 is molded integral with a sleeve 62 located axially thereof. This sleeve is slidably fitted over an upstanding spindle 64 fixedly mounted on the bottom of the casing 14, so that the turntable 18 is both rotatable and movable up and down relative to the spindle. The spindle 64 is disposed in vertical register with the center of the record 36 of the record cartridge within the cartridge holder 16 when the latter is in the fully closed position. FIG. 3 shows the turntable 18 together with the sleeve 62 raised off the bottom of the casing 14. This is because the rim of the turntable bears against the knurled output shaft 66 of the drive motor 20, for purposes that will become apparent presently.

The speaker 26 is also shown clearly in FIG. 3 comprises a cone 68 disposed under the turntable 18 in concentric, back-to-back relationship, and an armature 70 in the shape of a hollow cylinder integrally mounted on the top end of the speaker cone. The speaker cone 68 has its periphery secured, as by use of an adhesive, to the bottom edge of a skirt 72 in the shape of a hollow cylinder molded integral with and disposed concentrically under the turntable 18. The speaker 26 is therefore both rotatable and movable up and down with the turntable 18 relative to the spindle 64.

The armature 70 of the speaker 26 surrounds the sleeve 62 with substantial clearance and is received, also with substantial clearance, in the hollow, stepped boss which is formed centrally of the turntable 18 and which is directly connected to the sleeve 62. As will be noted from FIG. 2, the stepped boss of the turntable 18 is apertured to partly expose the top of the speaker armature 70. Resting on this exposed top of the speaker armature 70 is the vibration transmitter rod 28 for transmitting the vibrations of the stylus 24 to the armature and thence to the speaker cone 68.

The electric drive motor 20 for imparting rotation to the turntable 18 is powered from a battery, usually a dry cell or cells, that is housed in a battery magazine 74 formed integral with the casing bottom half 32. It will be seen from FIG. 2 in particular that the battery is electrically connected to the drive motor 20 via a variable resistor 76 mounted on the battery magazine and an on-off switch 78 on the bottom of the casing.

The variable resistor 76 is provided with a slide 80 movable back and forth along a linear guide slot formed in the battery magazine 74. As will be seen from FIGS. 1 and 2, the slide 80 can be manipulated from without the casing for adjustably varying the resistance value of the variable resistor and hence the speed of the drive motor 20.

The on-off switch 78 comprises a pair of switch contacts which in fact are cantilever springs self-biased so as to be out of engagement with each other. The on-off switch is provided with an upstanding actuator pin 82 slidably supported by the sleeve integral with the battery magazine 74 for moving the pair of switch contacts into and out of engagement with each other.

Thus, upon manual depression of the cartridge holder 16 to the fully closed position of FIG. 3, the switch actuator pin 82 is to be thereby depressed to move the pair of contacts of the on-off switch 78 into engagement with each other. The drive motor 20 can therefore be automatically set in rotation when the cartridge holder is depressed to the fully closed position, and can be automatically set out of rotation when the cartridge holder is raised to the half-closed position of FIG. 1 by the manipulation of the ejector lever 54.

The drive motor 20 is mounted on a resilient mount 84 cantilevered on the bottom of the casing 14. The resilient motor mount 84 is dually effective to urge the turntable 18 upwardly via the motor output shaft 66 and to afford firm frictional engagement of the motor output shaft with the turntable rim in driving relationship when the cartridge holder 16 is in the fully closed position. The upward motion of the turntable 18 when the cartridge holder 16 is in the half-closed position is limited by the aforesaid stop 56 formed integral with the swivel arm 50.

With the turntable 18 thus urged upwardly by the resilient motor mount 84, the stylus 24 on the tone arm 22 pivoted on the turntable can be maintained in positive engagement with the sound groove of the record cartridge 12 within the cartridge holder 16 when the latter is in the fully closed position, as will be apparent from a consideration of FIG. 3. The resilient motor mount 84 is further effective to isolate the vibrations of the drive motor from the casing 14.

The tone arm 22 having the upstanding stylus 24 thereon is pivotally supported at one end by a pin 86 planted on the turntable 18. A torsion spring 88 coiled around the pivot pin 86 is adapted to bias the tone arm 22 outwardly or away from the turntable spindle 64. A stop 90 on the turntable limits the outward movement of the tone arm in its starting position at the perimeter of the disc record 36 of the record cartridge held in-position by the cartridge holder 16. Thus, when the cartridge holder is raised to the half-closed position of FIG. 1 upon completion of playback, the tone arm 22 together with the stylus 24 thereon is automatically returned to the starting position under the bias of the return spring 88.

Also mounted on the turntable 18 is the vibration transmitter rod 28 which is substantially pivotally supported at one end by a bracket 92 secured to the turntable, although the rod may be supported in other than the illustrated way. The vibration transmitter rod 28 rests, at a point intermediate both ends thereof, on the top of the speaker armature 70 partly exposed through the aperture in the stepped turntable boss, as mentioned previously. The tone arm rests, at or adjacent its free end, on the vibration transmitter rod 28 for sliding movement, during playback, from the other end of the vibration transmitter rod toward its point of contact with the speaker armature 70.

Therefore, during rotation of the turntable 18 relative to the record cartridge 12, the mechanical vibrations set up in the stylus 24 by the undulations of the record groove are transmitted to the vibration transmitter rod 28 via the tone arm 22, and thence directly to the speaker armature 70, thereby causing the speaker cone 68 to generate audible sound. It will be noted from FIG. 2 that the stylus 24 is situated on the tone arm 22 closer to its pivot at 86 than its variable point of contact with the vibration transmitter rod 28.

In the phonograph 10 of the foregoing construction, the tone arm 22 is molded of plastics, which is comparatively easy to absorb vibrations, whereas the vibration transmitter rod 28 is made of metal such as aluminum alloy, which is less easy to absorb vibrations than plastics. The smaller the distance between the stylus and the variable point of contact of the tone arm 22 with the vibration transmitter rod 28, therefore, the better will the vibrations of the stylus be transmitted to the rod; and, the greater the distance between the said variable point and the fixed point of contact of the vibration transmitter rod with the speaker armature 70, up to a limit, the more will the vibrations be amplified before they reach the speaker armature.

Figure 4A:
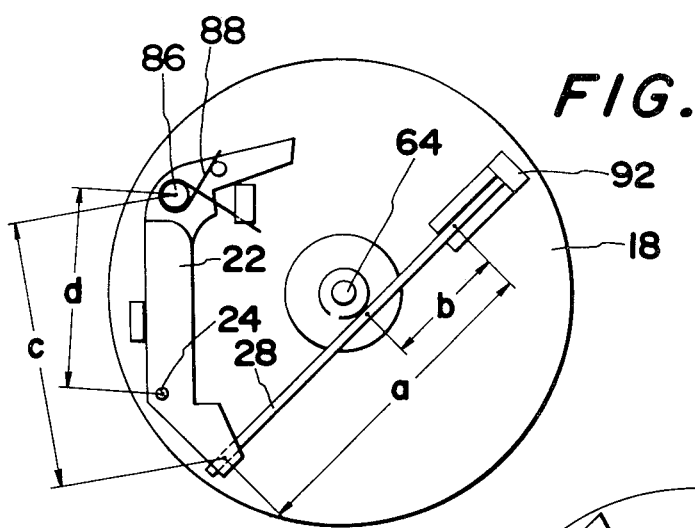
FIGS. 4A and 4B are schematic top plan views of the vibration transmission mechanism incorporated in the phonograph of FIGS. 1 through 3, the views being explanatory of the principles of my invention.

In view of the facts set forth in the preceding paragraph, any unnecessary change in the volume of sound generated by the speaker 26 during playback can be substantially avoided in the manner described hereinbelow in connection with FIGS. 4A and 4B. With reference first to FIG. 4A, the amplitude of vibrations actually transmitted from the stylus 24 to the speaker 26 when the tone arm 22 is in its starting position as shown, can be defined as $$\Delta Y = c/d \times b/a \times \Delta S \qquad (1)$$

where $\Delta Y$ is the amplitude of vibrations as actually transmitted to the speaker, $a$ is the distance between the pivot of the vibration transmitter rod 28 and its point of contact with the tone arm 22 when the latter is in its starting position, $b$ is the distance between the pivot of the vibration transmitter rod and its point of contact with the speaker armature 70, $c$ is the distance between the pivot of the tone arm and its point of contact with the vibration transmitter rod when the tone arm is in its starting position, $d$ is the distance between the pivot of the tone arm and the stylus 24, and $\Delta S$ is the amplitude of vibrations as imparted to the stylus by the undulations of the record groove.

Figure 4B:
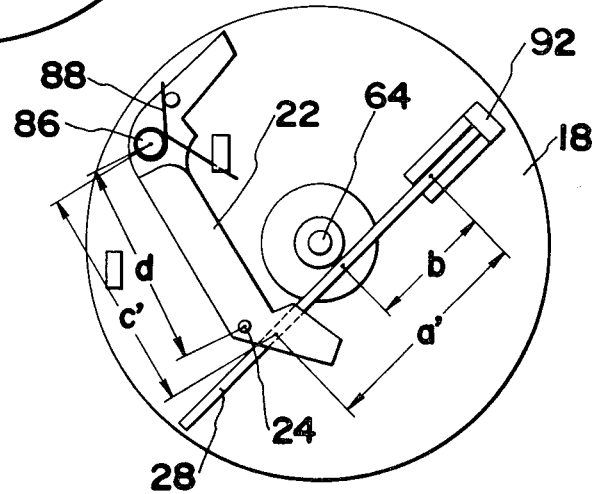

With reference then to FIG. 4B, the amplitude of vibrations actually transmitted to the speaker 26 at or immediately before the end of playback can be defined as $$\Delta Y = c'/d \times b/a' \times \Delta S \qquad (2)$$

where $a'$ is the distance between the pivot of the vibration transmitter rod 28 and its point of contact with the tone arm 22 when the latter is in its terminal position, and $c'$ is the distance between the pivot of the tone arm and its point of contact with the vibration transmitter rod when the tone arm is in its terminal position.

The sound generated by the speaker 26 will have the same volume at the start and the end of playback if the right sides of equations (1) and (2) are equal to each other.

$$c/d \times b/a \times \Delta S = c'/d \times b/a' \times \Delta S. \qquad (3)$$

Cancellation of like quantities from equation (3) gives $$c/a = c'/a'$$

or $$a'/a = c'/c. \qquad (4)$$

It is apparent from equation (4) that, in order to avoid any unnecessary change in the volume of sound generated by the speaker 26 during playback, the distance between the stylus 24 and the variable point of contact of the tone arm 22 with the vibration transmitter rod 28 should decrease in as exact proportion as possible to the distance between the said variable point and the fixed point of contact of the rod with the speaker armature 70, since the distances $b$ and $d$ remain unchanged throughout the course of playback.

In cases where the stylus 24 is situated closer to the pivot of the tone arm 22 than its variable point of contact with the vibration transmitter rod 28, as in the illustrated embodiment of my invention, then the decrease in the distance between the stylus and the variable point of contact of the tone arm with the vibration transmitter rod during playback can be made approximately proportionate to the decrease in the distance between the variable point and the fixed point of contact of the rod with the speaker armature if the angle between tone arm and vibration transmitter rod does not exceed 90 degrees throughout the course of movement of the tone arm from its starting position of FIG. 4A to its terminal position of FIG. 4B.

For further details on the construction and operation of the phonograph 10, reference is directed to my aforementioned copending application.

Although I have shown and described my invention as applied specifically to the phonograph for use with record cartridges, it will be understood that the invention is applicable to a variety of other types of sound reproducing apparatus. It will also be understood that the vibration transmission mechanism in accordance with my invention lends itself for use with phonograph records each having its starting point in the adjacency of its center instead of at its perimeter. It is therefore appropriate that my invention be construed broadly and in a manner consistent with the true meaning or proper scope of the appended claims.

I claim:

1. In a sound reproducing apparatus of the type wherein the mechanical vibrations set up in a reproducing stylus by the groove undulations of record means are transmitted directly to rotatable speaker means to cause the speaker means to generate audible sound, the improvement comprising:
   (a) means rotatable with the speaker means relative to the record means,
   (b) a tone arm pivotally supported at one end on said rotatable means,
   (c) a stylus carried on the tone arm proximate its other end, and
   (d) a vibration transmitter rod supported at least at one end on said rotatable means and held in contact with the speaker means at a point intermediate both ends thereof, the other end of said tone arm being held in contact with said vibration transmitter rod for sliding movement, during playback, between the outer end of said vibration transmitter rod and its point of contact with the speaker means such that the vibrations of the stylus are transmitted to the speaker means via said tone arm and said vibration transmitter rod, and
   wherein said tone arm and said vibration transmitter rod are so constructed and arranged that, during playback, the distance between the stylus and the variable point of contact of said tone arm with said vibration transmitter rod changes substantially in proportion to the distance between said variable point and the fixed point of contact of said vibration transmitter rod with the speaker means such that the variations in amplitude of sound reproduction are minimized over the length of travel of the tone arm.

2. In a sound reproducing apparatus of the type wherein the mechanical vibrations set up in a reproducing stylus by the groove undulations of record means are transmitted directly to rotatable speaker means to cause the speaker means to generate audible sound, the improvement comprising:
  (a) means rotatable with the speaker means relative to the record means,
  (b) a tone arm pivotally supported at one end on said rotatable means,
  (c) a stylus carried on the tone arm proximate its other end, said tone arm being made of material which comparatively easily absorbs vibrations, and
  (d) a vibration transmitter rod supported at least at one end on said rotatable means and held in contact with the speaker means at a point intermediate both ends thereof, said vibration transmitter rod being made of material which less easily absorbs vibrations than the tone arm material, the other end of said tone arm being held in contact with said vibration transmitter rod for sliding movement, during playback, from the other end of said vibration transmitter rod toward its point of contact with the speaker means such that the vibrations of the stylus are transmitted to the speaker means via said tone arm and said vibration transmitter rod, and
  wherein said tone arm and said vibration transmitter rod are so constructed and arranged in relation to the position of the stylus on said tone arm that, during playback, the distance between the stylus and the variable point of contact of said tone arm with said vibration transmitter rod may decrease in as exact proportion as possible to the distance between said variable point and the fixed point of contact of said vibration transmitter rod with the speaker means such that the vibrations in amplitude of sound reproduction are minimized over the length of travel of the tone arm.

3. In a sound reproducing apparatus of the type wherein the mechanical vibrations set up in a reproducing stylus by the groove undulations of record means are transmitted directly to rotatable speaker means to cause the speaker means to generate audible sound, the improvement comprising:
  (a) means rotatable with the speaker means relative to the record means,
  (b) a tone arm pivotally supported at one end on said rotatable means,
  (c) a stylus carried on the tone arm proximate its other end, said tone arm being made of material which comparatively easily absorbs vibrations, and
  (d) a vibration transmitter rod supported at least at one end on said rotatable means and held in contact with the speaker means at a point intermediate both ends thereof, said vibration transmitter rod being made of material which less easily absorbs vibrations than the tone arm material, the other end of said tone arm being held in contact with said vibration transmitter rod for sliding movement, during playback, from the other end of said vibration transmitter rod toward its point of contact with the speaker means such that the vibrations of the stylus are transmitted to the speaker means via said tone arm and said vibration transmitter rod, and
  wherein said stylus is situated on said tone arm closer to its one end than the variable point of contact of said tone arm with said vibration transmitter rod, said tone arm and said vibration transmitter rod being so constructed and arranged that, during playback, the distance between the stylus and the variable point of contact of said tone arm with said vibration transmitter rod may decrease in as exact proportion as possible to the distance between said variable point and the fixed point of contact of said vibration transmitter rod with the speaker means such that the variations in amplitude of sound reproduction are minimized over the length of travel of the tone arm.

4. In a sound reproducing apparatus of the type wherein the mechanical vibrations set up in a reproducing stylus by the groove undulations of record means are transmitted directly to rotatable speaker means to cause the speaker means to generate audible sound, the improvement comprising:
  (a) rotor means disposed under the record means and rotatable with the speaker means relative to the record means,
  (b) a plastic tone arm pivotally supported at one end on said rotor means,
  (c) a stylus mounted uprightly on the stylus proximate its other end, the stylus engaging the groove of the record means, and,
  (d) a metal vibration transmitter rod substantially pivotally supported at one end on said rotor means and resting at a point intermediate both ends thereof on the speaker means, the other end of said tone arm resting on said vibration transmitter rod for sliding movement, during playbacks, from the other end of said vibration transmitter rod toward its point of contact with the speaker means such that the vibrations of the stylus are transmitted to the speaker means via said tone arm and said vibration transmitter rod, and
  wherein said tone arm and said vibration transmitter rod are so constructed and arranged in relation to the position of the stylus on said tone arm that, during playback, the distance between the stylus and the variable point of contact of said tone arm with said vibration transmitter rod decreases substantially in proportion to the distance between said variable point and the fixed point of contact of said vibration transmitter rod with the speaker means such that the variations in amplitude of sound reproduction are minimized over the length of travel of the tone arm.

5. In a sound reproducing apparatus of the type wherein the mechanical vibrations set up in a reproducing stylus by the groove undulations of record means are transmitted directly to rotatable speaker means to cause the speaker means to generate audible sound, the improvement comprising:
  (a) a turntable disposed under the record means and having the speaker means mounted thereunder in concentric back-to-back relationship for simultaneous rotation relative to the record means, said turntable having an aperture to partly expose the speaker means,
  (b) a tone arm supported at one end in an eccentric position on said turntable, the tone arm being made of a material which comparatively easily absorbs vibrations,
  (c) a stylus mounted uprightly on the tone arm proximate the other end thereof, the stylus engaging the groove of the record means, and
  (d) a vibration transmitter rod substantially pivotally supported at one end on said turntable and resting at a point intermediate both ends thereof on the exposed part of the speaker means, said vibration transmitter rod being made of a material which less easily absorbs vibrations than the tone arm material, the other end of said tone arm resting on said vibration transmitter rod for sliding movement, during playback, from the other end of said vibration transmitter rod toward its point of contact with the speaker means such that the vibrations of the stylus are transmitted to the speaker means via said tone arm and said vibration transmitter rod, and wherein said tone arm and said vibration transmitter rod are so constructed and arranged in relation to the position of the stylus on said tone arm that, during playback, the distance between the stylus and the variable point of contact of said tone arm with said vibration transmitter rod may decrease in as exact proportion as possible to the distance between said variable point and the fixed point of contact of said vibration transmitter rod with the speaker means such that the variations in amplitude of sound reproduction are minimized over the length of travel of the tone arm.

* * * * *